United States Patent
Skjolsvold

(10) Patent No.: US 7,290,245 B2
(45) Date of Patent: Oct. 30, 2007

(54) METHODS AND SYSTEMS FOR NAVIGATING DETERMINISTICALLY THROUGH A GRAPHICAL USER INTERFACE

(75) Inventor: Arild E. Skjolsvold, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 423 days.

(21) Appl. No.: 09/982,395

(22) Filed: Oct. 18, 2001

(65) Prior Publication Data

US 2003/0076366 A1   Apr. 24, 2003

(51) Int. Cl.
 G06F 9/44 (2006.01)
 G06F 9/455 (2006.01)
(52) U.S. Cl. ........................ 717/125; 715/762
(58) Field of Classification Search ........... 345/855, 345/854, 762; 719/328; 715/855, 762, 854; 714/37, 38, 39, 29; 717/125, 134
See application file for complete search history.

(56) References Cited

U.S. PATENT DOCUMENTS

| 5,627,979 | A | | 5/1997 | Chang et al. |
| 5,781,720 | A | * | 7/1998 | Parker et al. ............... 714/38 |
| 6,002,871 | A | * | 12/1999 | Duggan et al. ............ 717/135 |
| 6,069,630 | A | | 5/2000 | Lisle et al. |
| 6,091,416 | A | | 7/2000 | Cragun |
| 6,356,902 | B1 | * | 3/2002 | Tan et al. .................... 707/10 |
| 6,415,396 | B1 | * | 7/2002 | Singh et al. ................ 714/38 |
| 6,580,440 | B1 | * | 6/2003 | Wagner et al. ............ 345/762 |
| 6,854,089 | B1 | * | 2/2005 | Santee et al. ............. 715/783 |
| 6,948,152 | B2 | * | 9/2005 | Dubovsky ................. 717/124 |
| 2003/0046609 | A1 | * | 3/2003 | Farchi et al. .............. 714/30 |

* cited by examiner

Primary Examiner—John Cabeca
Assistant Examiner—Dennis G. Bonshock
(74) Attorney, Agent, or Firm—Lee & Hayes, PLLC

(57) ABSTRACT

Disclosed is a mechanism for systematically invoking executable features of a software application via its graphical user interface. Also disclosed is a mechanism for generating a map that characterizes operational states of an application as it executes. An application driver selects an action to be performed by the application according to a deterministic mode such as depth-first mode or breadth-first mode. In the depth-first mode of deterministic operation, an action associated with a particular element is explored as deeply as possible, while breadth-first mode explores the application as widely as possible. For each executable feature invoked within the software application, the states encountered during execution are stored within the application map for subsequent retrieval and analysis.

25 Claims, 6 Drawing Sheets

FIG. 7

```
92   <!ELEMENT element    (element | hwnd | caption | order | resource-id)* >
93   <!ELEMENT hwnd       (#PCDATA) >
94   <!ELEMENT caption    (#PCDATA) >                600
95   <!ELEMENT order      (#PCDATA) >
96   <!ELEMENT resource-id (#PCDATA) >               602
97
98   <!ELEMENT elements   (element)* >
99
100  <!ELEMENT action     (script-file | client-x | client-y | index | text)* >
101  <!ELEMENT script-file (#PCDATA) >
102  <!ELEMENT client-x   (#PCDATA) >
103  <!ELEMENT client-y   (#PCDATA) >
104  <!ELEMENT index      (#PCDATA) >
105  <!ELEMENT text       (#PCDATA) >                604
106
107  <!ELEMENT action-event (elements-before-action,
108                          element,
109                          action,                  606
110                          elements-after-action)
111  >
112  <!ELEMENT elements-before-action (elements) >
113  <!ELEMENT elements-after-action  (elements) >
114  <!ELEMENT appdriver-complete   EMPTY >
115  <!ELEMENT appdriver-failed     EMPTY >
116
117  <!ELEMENT appdriver-script    (element, action)* >
118
119  <!ELEMENT disable-actions     (element, action)* >
120
121  <!ATTLIST element
122          type       (unknown|main-app-wnd|menu-item|popupmenu|menubar|
123                      dialog|static-text|group-box|edit-box|push-button|
124                      check-box-2state|check-box-3state|radio-button|
125                      list-box-single-select|list-box-extended-select|
126                      list-box-multi-select|list-box-no-select|
127                      combo-box-simple|combo-box-dropdown|              608
128                      combo-box-dropdownlist|spin|tab-strip|tab|
129                      property-page|list-view-single-select|
130                      list-view-extended-select|tree-view|slider|
131                      scroll-bar|any|check-box|list-box|combo-box|
132                      list-view)
133                     #REQUIRED
134          enabled    (yes|no)         "yes"
135          read-only  (yes|no)         "no"
136          format     (win32|sdm|html|any)   "any"
137  >
138
139  <!ATTLIST action
140          type       (noop|script|cancel|close|click|double-click|
141                      control-click|shift-click|right-click|
142                      check|uncheck|halfcheck|select|
143                      select-one-item|unselect-one-item|
144                      select-additional-item|double-click-item|        610
145                      right-click-item|edit-set-text|edit-add-text|
146                      edit-paste|edit-cut|spin-down|spin-up|spin-min|
147                      spin-max|slide-down|slide-up|slide-min|slide-max|
148                      scroll-line-down|scroll-line-up|scroll-page-down|
149                      scroll-page-up|scroll-end|scroll-home|any|edit|
150                      spin|slide|scroll)
151                     #REQUIRED
152  >
153
```

METHODS AND SYSTEMS FOR NAVIGATING DETERMINISTICALLY THROUGH A GRAPHICAL USER INTERFACE

TECHNICAL FIELD

This invention relates generally to automated software test systems, and particularly, to an automated software test system that systematically invokes executable features presented to a user via a graphical user interface.

BACKGROUND OF THE INVENTION

Today's software products are increasingly complex, often capable of performing numerous tasks simultaneously and operating upon multiple platforms and operating systems. In addition, many software products in use today are graphics intensive and employ graphical user interfaces (GUIs) that correlate graphics elements (e.g., buttons, dialog boxes, menus) to the executable features of the products. This allows a user to easily navigate through an application to perform a desired task. Invariably, to ensure the reliability of software products, comprehensive testing and debugging are key components to the software development process. In general, software testing and debugging are the processes of identifying and correcting programmatic or operational defects within a software product.

Many defects that occur within a software product are not fully exposed until the application is actually in execution, referred to as being "in a runtime state." For example, a newly developed application may stall or produce an error message when its user selects a certain button or menu from a GUI during runtime. Other common errors that occur within GUI-based applications are visual defects, such as text truncation and spelling errors. Such errors occur even more frequently in software products that have been "localized." Software is localized when it has been translated or adapted from its original language to a new language to accommodate new users. Oftentimes, in adapting the software to the new language, one or more text strings are left untranslated. To identify these errors prior to deployment into the intended market, the functions and features of the product should be tested exhaustibly during runtime.

One method of testing the features of an application is to employ an automated test application, commonly referred to as a "monkey". Monkeys are executable applications that contain instructions for automatically exercising, or invoking, the features of an application under test. Monkeys allow executable states, or actions, of the application to be exposed during runtime and subsequently verified for proper operation by the tester. For example, a monkey can be used to automatically activate menus, buttons, dialog boxes, and other graphics elements that represent the features of a typical GUI-based application as it executes. In operation, the monkey randomly selects an action or graphics element from within the GUI—perhaps the "File" button—resulting in a drop down menu of other user options (e.g., New, Open, Exit) being displayed to the screen. This random selection of actions or graphics elements is continued until the software tester terminates the process manually or until the monkey encounters an un-recoverable system or programming error (e.g., invalid command, system crash).

The monkey is a "dumb" test, meaning it has no model or understanding of the software under test. It simply activates any executable action or graphics element within the software package without regard to the operation underlying the action or graphics element. This characteristic makes monkeys cheap to design and easy to program, as they need not be customized to fit the application under test. Also, the relative ease of designing test monkeys makes them particularly useful during the early stages of testing, where most defects or errors are found. Furthermore, by automating the GUI-testing process, the software tester does not have to manually invoke each of the actions and graphics elements that make up the application. This reduces the time required for testing user interface features and eliminates any human error that could result from manual execution. All of these features are particularly useful in the testing of graphics-oriented software packages having several executable features and options.

Monkeys, however, are not without some inherent limitations. Because conventional monkeys and other automated testing techniques perform random acts upon the software, unnecessary test repetition can occur. This results in significant time being consumed in order to fully exercise an application under test. Even further, repetition compounds the cost of testing a product, especially those products having several features and associated graphics elements that are accessible from a GUI. Typically, monkey tests must run for several days at a time in order to fully explore the GUI of a software product. Obviously, this hinders the timeliness of product development and deployment processes.

As another drawback, random execution of the GUI of a software application does not promote a structured, sequential approach to testing, an approach often required to identify the source of bugs. For example, a dialog box displayed by the user interface may consist of various graphics elements including text, a button, and a list box. Activation of the button can result in the display of an entirely new dialog box by the user interface, representing an entirely new state of the application. In order to identify errors that occur as a result of transitioning between states, or to identify the graphics element or actions that correspond to a particular error, the software tester must know the relationship between various states. Unfortunately, this relationship cannot be easily established when executing test monkeys, as actions can be executed in a non-sequential (random) order. Monkey testing, while automatic, is not systematic in its approach to exercising the features of an application.

To overcome the limitations described above, a way is needed to exercise a GUI of an application quickly and systematically, such that the time and cost associated with debugging and testing are minimized. Furthermore, a way is needed to record, or map, the various states of the software as it executes so that relationships between graphics elements and actions of the application can be easily determined.

SUMMARY OF THE INVENTION

The present invention presents a mechanism for systematically exploring a graphical user interface (GUI). Moreover, the invention presents a method for generating a map that characterizes the operational states of an application as it executes. The invention can be applied to any software application that employs a graphical user interface to expose executable features of the application to a user.

In accordance with the present invention, a computer-executable application driver scans a GUI of an application to be explored for information related to its graphics elements. This results in the acquisition of information related to top-level graphics elements of the GUI. These elements characterize the initial state of the application. From this information, the application driver chooses one of the top-level elements and then chooses an action to perform on that element. The application driver records each state it encounters and each action it performs. For example, the application driver records its encounter with a particular state, such as the presentation of a particular dialog box, and records that it activated a button within the dialog box. The next time the same dialog box is encountered, the application driver may choose the same button but may select a different action to be performed. In a preferred embodiment, it will continue to select this button each time it encounters the dialog box until all actions associated with the button have been performed. Whenever an action is performed, the record of elements and associated actions is updated.

To ensure that the application driver invokes all of the actions associated with the GUI, the driver may explore the application in depth-first mode or breadth-first mode. In depth-first mode, an action associated with a particular element is explored as deeply as possible before moving on to another action. In breadth-first mode, the application driver explores all actions before probing the depth of any one action. To illustrate the difference, an application's interface can be thought of as a tree of UI elements and actions. At the top of the tree is the main window, and it has a set of children that are the top-level elements, for example menu items File, Edit, and Help. In turn, the File menu has children New, Open, and Exit. In depth-first mode, the application driver first chooses File, then New, and then fully explores New's subsequent dialog. Next, the driver explores File/Open, then File/Exit before returning to the Edit Menu. In breadth-first mode, the application driver first chooses File, then Edit, etc.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 7 is a data definition diagram illustrating a suitable format for storing information related to graphics elements and associated actions exposed by an application.

DETAILED DESCRIPTION OF THE INVENTION

Figure 1:
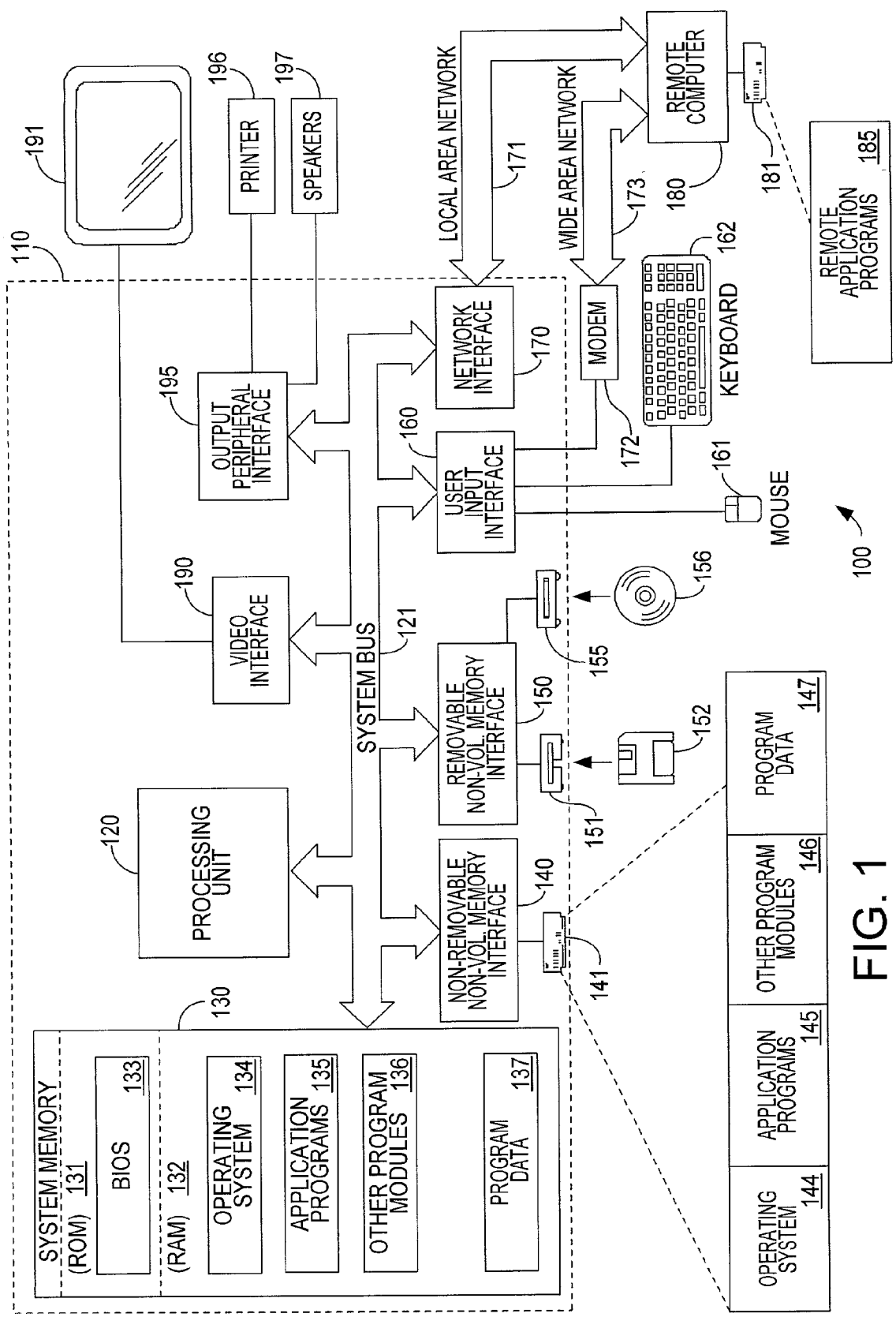
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in such a context, it is not meant to be limiting as those of skill in the art will appreciate that the various acts and operations described hereinafter may also be implemented in hardware.

Before describing the invention in detail, the computing environment in which the invention operates is described in connection with FIG. 1. Although the invention may be incorporated into many types of computing environments as suggested above, the following detailed description of the invention is set forth in the context of an exemplary general-purpose computing device in the form of a conventional PC.

Exemplary Computing Environment

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The computing system environment 100 includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

Computer 110 typically includes a variety of computer-readable media. Computer-readable media can be any available media that can be accessed by computer 110 and include both volatile and nonvolatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules, or other data. Computer storage media include, but are not limited to, random-access memory (RAM), read-only memory (ROM), EEPROM, flash memory or other memory technology, CD-ROM, digital versatile disks (DVDs) or other optical disk storage, magnetic cassettes, magnetic tape, magnetic disk storage or other magnetic storage devices, or any other medium that can be used to store desired information that can be accessed by computer 110. Communication media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communication media include wired media such as a wired network or direct-wired connection and wireless media such as acoustic, RF, infrared, and other wireless media. Combinations of any of the above should also be included within the scope of computer-readable media.

The system memory 130 includes computer storage media in the form of volatile or nonvolatile memory such as read-only memory 131 and random-access memory 132. A basic input/output system 133 (BIOS), containing the basic routines that help to transfer information between elements within computer 110, such as during start-up, is typically stored in ROM 131. RAM 132 typically contains data and program modules that are immediately accessible to or presently being operated on by processing unit 120. By way of example, and not limitation, FIG. 1 illustrates operating system (OS) 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user-input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be another personal computer, a server, a router, a network PC, a peer device, or other common network node and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN-networking environment, the personal computer 110 is connected to the LAN 171 through a network interface or adapter 170. When used in a WAN-networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Navigating Deterministically Through a GUI

The present invention provides a systematic approach to exploring features of a GUI of a software application. By exploring the GUI systematically rather than randomly, test repetition is eliminated. Furthermore, the invention provides a mechanism for mapping information related to states of the software application as they are explored. A software tester can retrieve this information for subsequent use or analysis. This is advantageous to software testers, as hand-drawn process charts and flow diagrams, often prone to human error, need not be relied upon for testing the accuracy of the software application. The features of the invention will be described in greater detail in later sections of the detailed description. For now, an example of a software application employing a GUI is provided in FIG. 2.

As illustrated in the figure, the GUI 202 for a "target application" comprises several graphics elements, e.g., 204 and 206 that represent executable features of the application. A graphics element is any object that can be rendered to a user interface screen (monitor) 191 by a software application executing upon a computer 110. Graphics elements include computer-implemented objects that display lines, text, images, and other graphics primitives to the GUI. These include, but are not limited to, control and dialogue boxes, functional buttons, menu screens, combo boxes, and any graphics windows that are capable of being executed or invoked by an application run by the operating system 134.

A "target application" is a process, executable procedure, or application that operates according to methods and functions defined by the operating system 134. By working in conjunction with the operating system 134, a user of the computer 110 is able to access features of the application via the application's GUI. A target application can be stored in system memory 130 as an application program 135 or can be retrieved and executed from external memory devices such as the system hard drive 141, floppy disk 152, or CD-ROM 156. The target application is responsible for generating its GUI 202.

Figure 2:
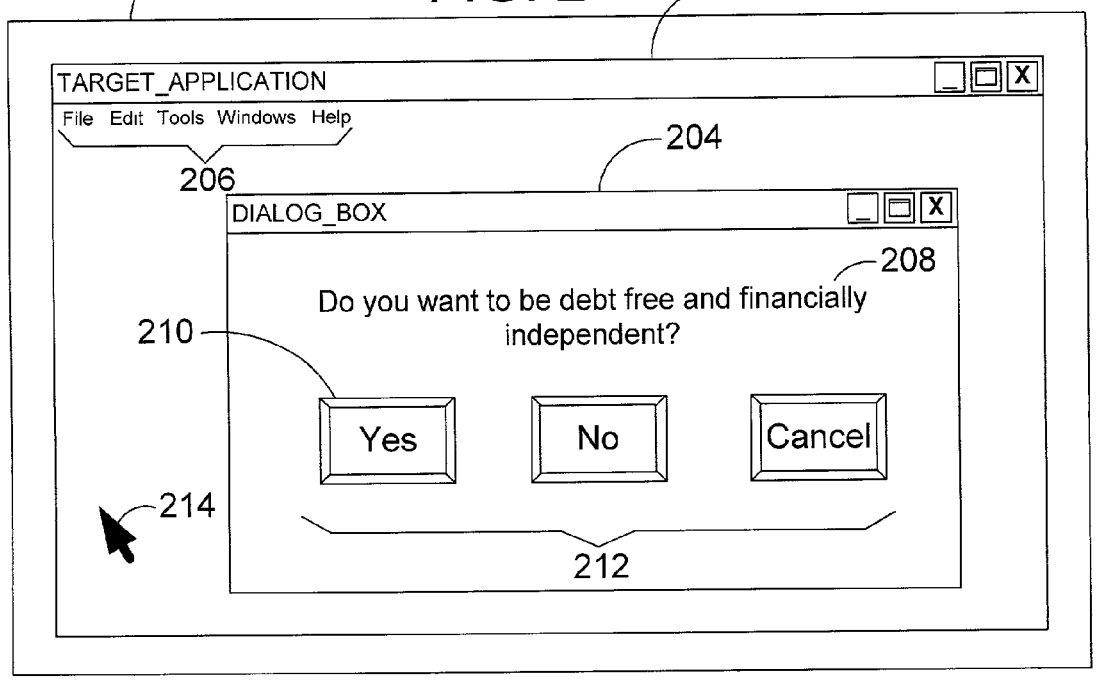
FIG. 2 is a block diagram illustrating a target application within a user interface having a dialog box spawned as a result of an invoked action within the application.

As shown in the GUI 202 of the target application in FIG. 2, a dialog box 204 is spawned as a result of an invoked action, such as clicking one of the menu items 206 with the mouse 161. The mouse pointer 214 indicates the location of the mouse in relation to the GUI 202. The dialogue box 204 consists of three user-option buttons 212, which can be activated with the mouse pointer 214 to provide a logical response to the action of the dialogue box 204. All of the buttons 212 and the associated text field 208 are child controls of the dialogue box 204. A child control, or child object, is a graphics element initiated by a parent object. Each object has its own handle, which is a unique identification number assigned by the operating system 134 to distinguish one object from another. The handles of display objects are stored in a resource file (*.res) associated with an executable application. The handle of each of the children is inherited directly from the parent object.

In FIG. 2, the action of the dialogue box 204 is to assess a user's desire to become debt free and financially independent. Based on the user's selection of one of the buttons 212, another action (e.g., a new dialog box or execution of code) is invoked within the target application. For practically every action performed or invoked within the target application, a state transition occurs. The term "state" refers to a distinct mode of operation, or the current status, of a program in execution by the computer 110. More specifically, the state of an application refers to a unique set of graphics elements, content, and associated actions. For example, the current state of a dialog box displayed to the GUI is defined by the buttons it consists of, the positions and appearance of the buttons, and the text that is displayed. If an action is invoked within the dialog (e.g., by clicking a button with the mouse 161), then a state transition within the dialog may occur. This is manifested as a change in the appearance of the dialog, such as by a color change or a text modification. From a broader perspective, a state transition can also relate to a change in the particular mode of operation of the software application. For instance, a word processing application may be capable of operating in a text-editing mode and a Web-publishing mode. Each of these modes represents a different state of the application. The current state of the software as illustrated in FIG. 2 is defined by the composition of graphics elements 204, 206, and associated actions ("Yes," "No," "Cancel") that are exposed by the dialogue box 204.

Figure 3:
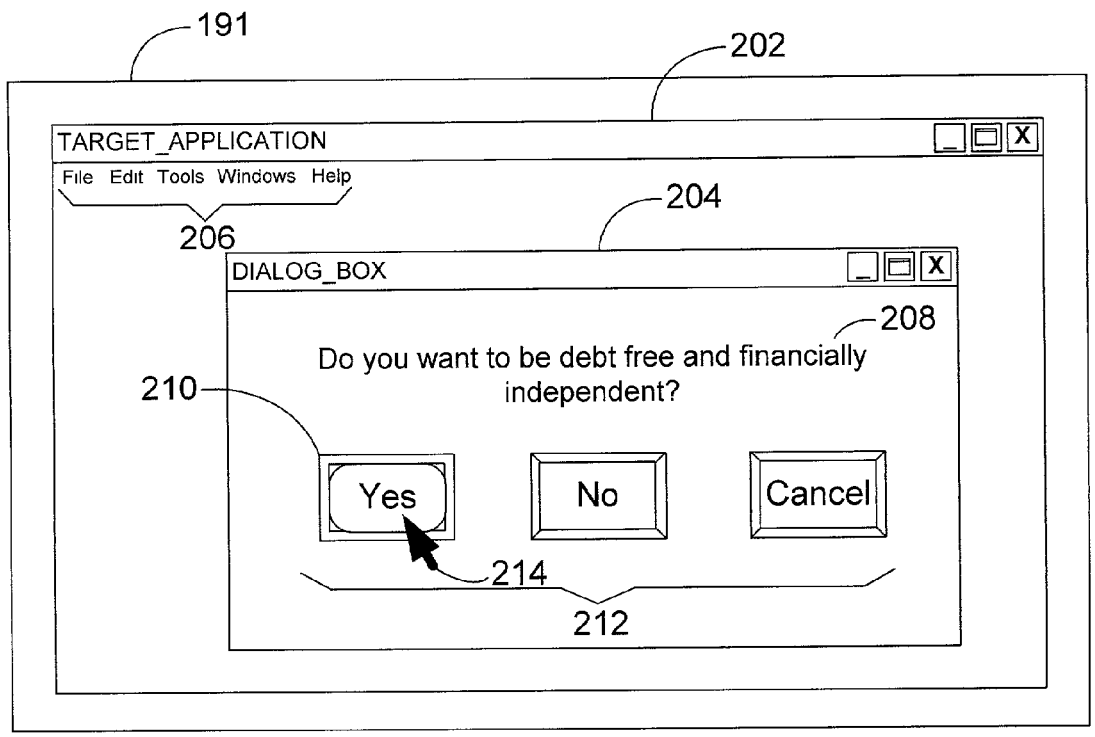
FIG. 3 is a screen shot illustrating a target application within a user interface with the dialog box in a different operational state from that of FIG. 2.

Turning now to FIG. 3, an example of a state transition within the dialogue box 204 is shown. In this example, a state transition occurs as a result of placing the mouse pointer 214 over the user button 210. This type of action, where the mouse pointer affects a graphics element without actually clicking the element, is referred to as a "mouse over." As a result, the appearance of the button changes ("Yes" is embellished with an oval outline). While this is only a subtle change in the appearance of the GUI, it nonetheless represents a change in the state of operation of the target application. In accordance with the methods of the operating system, this state is defined by its own unique identifier number and other properties that distinguish it from the state shown in FIG. 2.

FIG. 3 provides only one example of a state transition. Most applications contain numerous states, all of which require accurate testing to ensure their proper functioning. In performing this testing, it is impractical for a software tester to manually identify and test each individual state transition. Traditional automated tests are random and often do not provide the information necessary for identifying code defects. The present invention provides a means of addressing these limitations.

Figure 4:
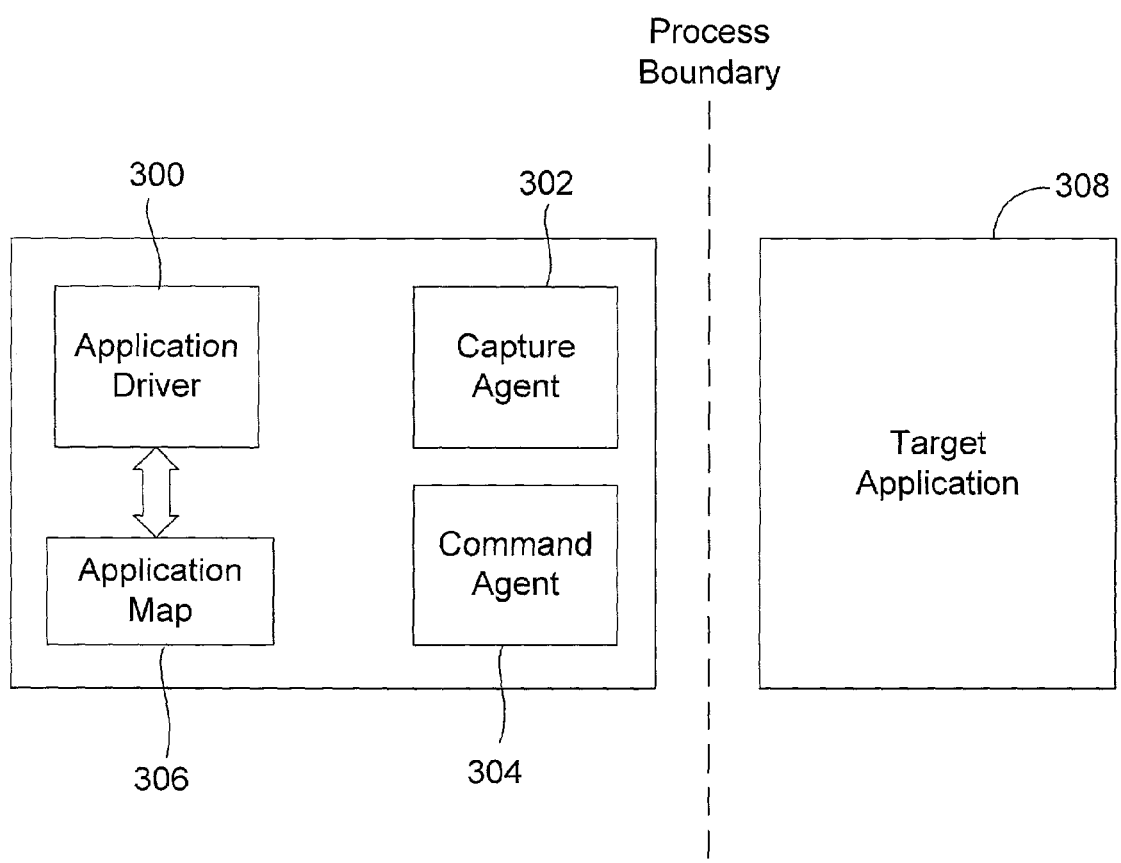
FIG. 4 is a block diagram illustrating the major components of an exemplary embodiment of the invention.

FIG. 4 illustrates the components of an exemplary embodiment of the invention. An application driver 300 is an executable component having instructions for directing the systematic invocation of features provided by a target application 308. The application driver 300 is responsible for executing graphics elements and associated actions that are exposed to a user through a GUI by the target application 308. The application driver 300 directs the execution of features of the target application automatically so that user interaction is not required. Unlike traditional automatic software execution programs, such as monkeys, the application driver 300 does not compel random events. Rather, the application driver 300 drives the execution of the application in a deterministic, or directed manner, which significantly optimizes the software execution and testing processes. Deterministic execution is facilitated by an application map 306, a component for maintaining a logical storage of the events or states of the target application as they are executed. This record of states encountered during execution can be referred to by the application driver 300 for directing the application 308 to states not yet explored. The interaction between the application driver 300 and application map 306 will be described in greater detail in later sections of the description. For now, attention is given to the other components used by the application driver 300 for directing the execution of the target application 308.

In order to interpret the contents (graphics elements) of a GUI and to invoke the actions associated with each of the graphics elements, the application driver 300 relies upon a capture agent 302 and a command agent 304, respectively. As illustrated in FIG. 4, the application driver 300 communicates with, or polls, the capture agent 302 to retrieve information descriptive of the current state of the target application 308. The information retrieved by the capture agent 302 includes the types of the graphics elements currently displayed by the UI, any captions contained within a particular graphics element and their order of appearance, the element identifier number assigned by the OS 134 or target application 308, the type of action (e.g., a button click) that resulted in the current state of the target application 308, and any other properties of the GUI and target application. Those skilled in the art will appreciate that the invention is not limited to any particular information, as any data exposed by the graphical user interface are retrievable.

There are various methods for retrieving information descriptive of the properties and underlying actions of the GUI that can be employed by the capture agent 302. One such method is to access the resource (*.res) files related to the GUI of the target application 308. In MICROSOFT "WINDOWS"-based applications, for example, graphics primitives are stored in a resource file associated with the target application 308's executable (*.exe). Resource files are text-based computer files that indicate the resources required for the application to run successfully and can be viewed with a standard resource editor/viewer tool. Resource files are converted into a binary representation at compile time and then merged into the executable image of the application. The resources indicated by the resource file are extracted from the executable at runtime to be presented to the user as menus, dialog boxes, cursors, icons, toolbars, bitmaps, and other graphics elements composed of one or more graphics primitives. The resources specified in the resource file can be accessed by the capture agent 302 to obtain information about the properties of the graphics elements that make up the GUI of the target application.

The capture agent 302 can retrieve information pertaining to the state of the target application 308 by using standard hook functions and system patches to spy on the target application as it executes. For example, the capture agent 302 can inject a spy DLL (Dynamic Link Library) into the executable code of the target application 308. A DLL is a module of executable code that is activated upon the request of a specific application or of the operating system. Once the spy DLL is injected, it installs patches and hook functions into the operating system APIs (Application Programming Interfaces) that have routines for rendering graphics elements of the target application's GUI. The hook functions monitor the operating system messages generated during the execution of the target application, while the patches allow for the capture of graphics elements and associated actions that are drawn to the user interface. Because the graphics elements are captured in connection with the operating system messages passed during runtime, the capture agent 302 obtains complete information about the current state of the target application 308. Developers of software applications frequently use mechanisms such as spy DLLs, patches, and hook functions to observe the internal state of an application as it executes. Other techniques for retrieving information pertaining to the state of the target application 308 as exposed by the GUI may also be employed.

Another component relied upon by the application driver 300, specifically for invoking the underlying action associated with a graphics element in the GUI of the target application 308, is the command agent 304. The command agent is an executable component that is capable of calling the necessary API routines, OS mechanisms, and target application processes that result in the execution of particular actions. For example, the primary API for WINDOWS, known as Win32, provides a complete set of functions to format and draw text primitives to a target application 308's GUI. These functions, such as CreateWindow, MoveWindow, andSetWindowText, affect the display and appearance of popup windows and corresponding text. Within the WINDOWS environment, the command agent 304 calls these functions to render the appropriate output to the display. Further, the command agent 304 invokes specific executable code and processes that allow for the importation and exportation of data, start and stop of specific tasks, storage of information, and all other features of the application that are correlated with the GUI.

The application driver 300, capture agent 302, and command agent 304 all interact with one another to provide the necessary functions required to carry out the methods of the invention. Functionally, these components may be implemented as hardware or firmware components capable of processing machine language instructions for performing the actions described in the foregoing paragraphs. Likewise, each of the components can be implemented as software in the form of DLLs, executable program modules, command scripts, or any computer-executable routines or instructions that are developed according to a specific command language such as C/C++, Java, etc.

Figure 5:
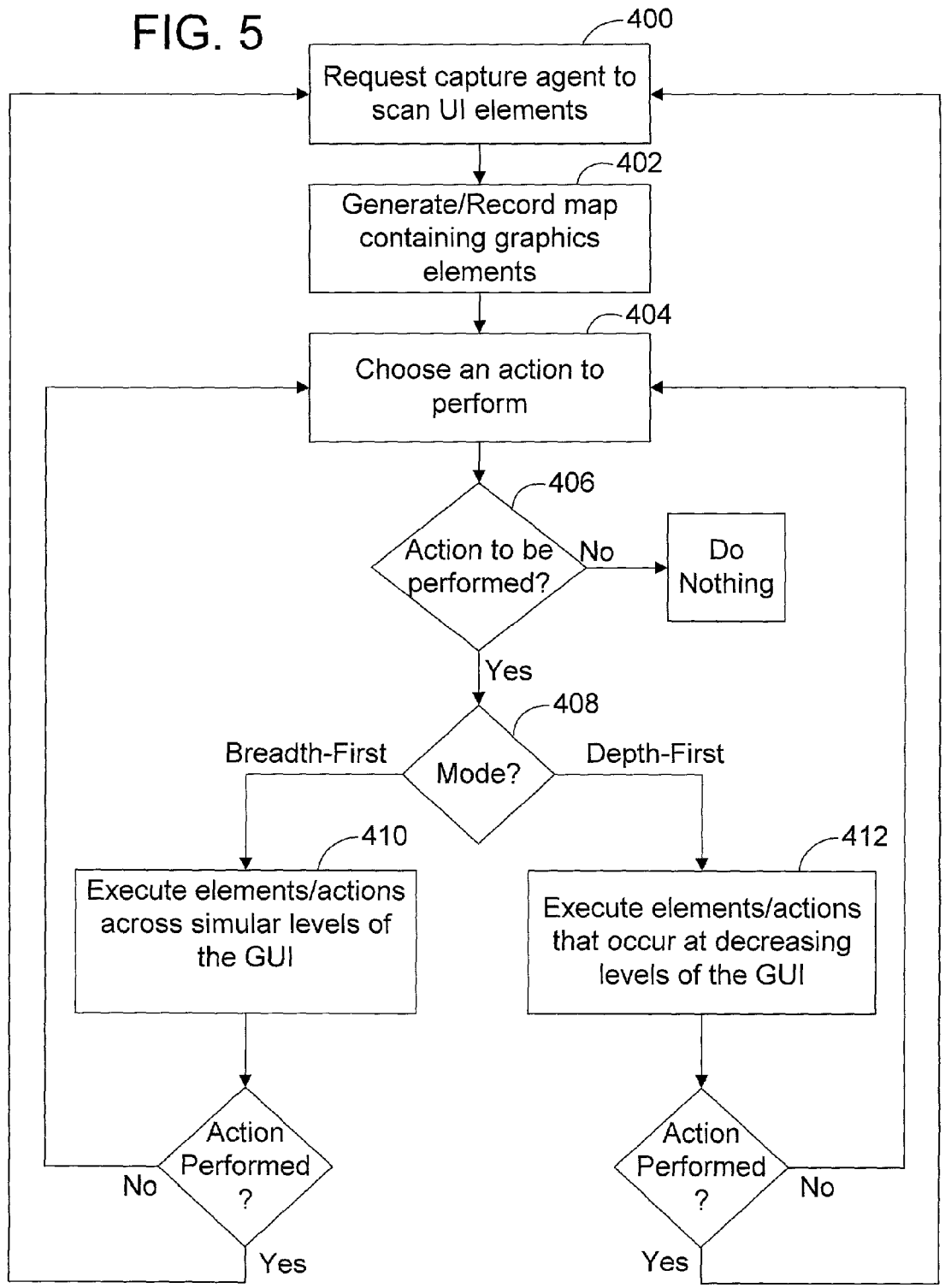
FIG. 5 is a flow chart illustrating an exemplary method for executing the features of the invention.

The flowchart of FIG. 5 further describes the interactions that take place between the components for performing the methods of the invention. In order to direct the execution of the target application 308, the application driver 300 sends a request for the capture agent 302 (event 400) to retrieve information pertaining to the current state of the application. In response to this request, the capture agent 302 interprets the contents of the graphical user interface rendered by the target application 308 and extracts specific information such as the element types presented and their associated actions, specific text strings displayed, unique element identifier numbers (e.g., software handles), and other properties that define the GUI. The capture agent 302 then returns this information to the application driver 300. The application driver 300 arranges and records this information in a logical format as an application map 306 (event 402). The application map is a file wherein the information retrieved by the capture agent 302 can be formatted, stored, and retrieved for subsequent analysis. FIG. 7 and the accompanying text discuss one possible data storage scheme for the application map.

Once the information is retrieved and stored in the application map 306 by the application driver 300, the application driver 300 selects an element and corresponding action from the map to be invoked (event 404). Upon selecting an action to execute, the application driver communicates with the command agent 304 to fulfill the request by invoking the particular action. The sequence in which the application driver invokes actions within the target application 308 is determined according to one of several possible "deterministic" modes. Deterministic operation ensures a systematic approach to driving the execution of the target application 308. This is in contrast to conventional mechanisms for executing the features of a software application where random execution of events is the norm.

Figure 6:
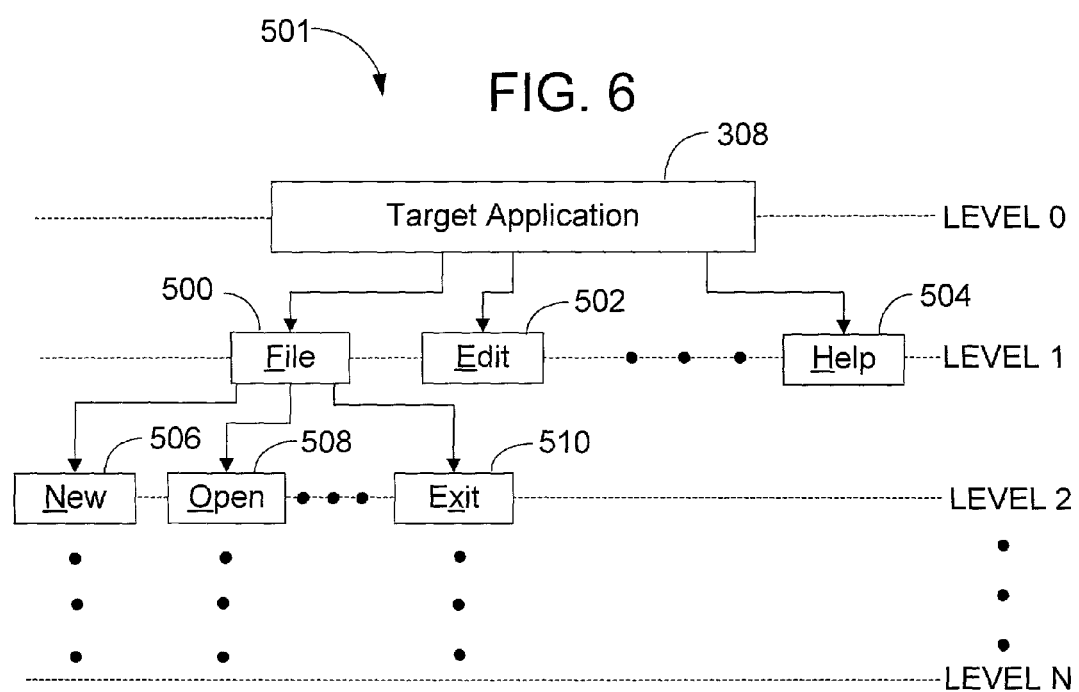
FIG. 6 is a block diagram illustrating a target application's interface as a tree of user interface elements at varying levels.

Described here are the breadth-first or depth-first deterministic modes of operation. In the breadth-first mode of operation, actions at higher levels of the target application's hierarchy of execution are invoked first, while subsequent levels of the hierarchy are performed last. This means that actions are invoked across similar levels of the application first. In the depth-first mode of operation, actions at successively lower levels of the target application's hierarchy of execution are invoked first until no lower-order levels are available. This means that actions are invoked at deep levels of the application first. FIG. 6 illustrates the difference between these two modes of operation. A target application 308 can be depicted as a hierarchical tree 501 of graphics elements and actions. At the top of the tree 501 is the main window of the target application 308. At the next level are the children of the main window, here the top-level menus File 500, Edit 502, and soon on to Help 504. In turn, the File menu has children at the next level of the hierarchy, namely New 506, Open 508, and Exit 510. In the breadth-first mode of operation, the application driver 300 first executes File 500, then Edit 502, and fully across Level 1 of the hierarchy through Help 504. In depth-first mode, the application driver 300 first chooses File 500 at Level 1, then New 506 at Level 2, and then fully explores the subsequent dialog. The execution of the application is driven until the deepest hierarchy level for New 506, Level N, is reached. Then File/Open 508 is fully explored, and then the other children of File. Only then does the application driver 300 return to execute the Edit menu 502 at Level 1.

Returning now to FIG. 5, the command agent 304 executes the actions in the deterministic order set by the application driver 300 (events 410 or 412). The resultant action potentially leads the target application 308 to enter a new state, in which case more actions are available for execution, and the steps are repeated. For each new state exposed within the target application 308 as a consequence of the directed execution by the application driver 300, the resulting graphics elements are recorded into the application map 306 (events 400 and 402). This process is repeated until no more actions are available for execution.

In addition to storing GUI- and operating state-specific information within the application map 306, the application driver 300 maintains an indicator (e.g., counter) for each state encountered during execution of the target application 308. These indicators are stored in the application map for every state and state edge encountered, providing an indication of the number of times each state and edge has been visited. A state edge is a state and an associated path to another operational state. As the map is built, the indicator is updated accordingly. Using the indicator in conjunction with the elements and actions contained within the map, the application driver is able to determine systematically the next action to invoke. For instance, in FIG. 2 a dialog box 204 consisting of three user buttons 212 and a text field 208 is shown. The composition, arrangements, and associated actions of these graphics elements define the current state of the dialog box 204. Until one of the buttons is invoked, the indicator related to each button specifies that no associated actions have been activated (note here that each button represents a state edge—the action of the button may be a path to another state, such as a different dialog box). If the "Cancel" button is invoked, the indicator for this button is updated, and the dialog box is closed. Because the indicators for the other buttons of the dialog box 204 are not yet set (e.g., incrementing a counter, activating a flag), the application driver knows that these buttons have yet to be executed. Thus, the application driver can execute these features the next time this dialog box is encountered.

The process of continually updating the application map 306 allows the sequential execution of the software program 308 to be recorded dynamically. Furthermore, by updating the state and edge indicators, the various state transitions, edges, and subsequent actions related to each state can be tracked throughout execution. This is significant particularly in software testing where access to such information is not often readily available, short of hand-drawn software trees or process diagrams. Bugs and code defects occurring at specific locations, or levels, of the target application can be easily identified and even re-invoked by the application driver 300 by simply returning to the applicable point of execution within the application map 306, and recalling the subsequent action using the command agent 304.

To provide further details of the construction and format of the application map 306, an example data structure is presented in FIG. 7. In lines 92-96, an element (e.g., a graphics element) is defined as having various properties, including a resource identifier value 602 and an order of appearance within the interface 600. Events are defined with relation to the execution of the application. For instance, the application map stores information pertaining to the appearance of the GUI and its associated graphics elements prior to and after a state transition occurs. Categorizing events in this way allows a client, such as a software tester, to refer to the state of the target application at a specific period of execution. The application map also defines element types 608 and action types 610 related to the software application. Access to such information is necessary for the application driver 300 so that it may direct the execution of the target application 308. Please note that in this example, the contents of the application map are arranged in XML (Extensible Markup Language) format. However, this is only one example of a suitable content model for representing the application map 306. In particular, the information can be formatted according to data representations such as XML, SGML, HTML, or XHTML. Indeed, any language wherein data are logically formatted for later interpretation by a user or machine-executable program is suitable for the present invention. As such, the model provided in FIG. 7 is not to be misconstrued as limiting the scope or nature of the invention, as there exist numerous formats for storing and arranging data. The invention contemplates the usage of all such data storage, data modeling, and representation schemes.

The invention as described herein can be incorporated into the source code of an existing application such as a software-testing program or executed as a stand-alone mechanism for driving the execution of a target application. For instance, the application driver 300 and application map 306 can be implemented as separable modules of varying functionality or incorporated in their entirety into the executable code of another application. Also, the application driver 300 can be used in conjunction with any data retrieval and modeling mechanisms, as well as code-execution mechanisms, to carry out the methods of the invention. No code modifications need to be made to the application under test in order to employ the methods of the invention.

All of the references cited herein, including patents, patent applications, and publications, are hereby incorporated in their entireties by reference. In view of the many possible embodiments to which the principles of this invention may be applied, it should be recognized that the embodiment described herein with respect to the drawing figures is meant to be illustrative only and should not be taken as limiting the scope of invention. For example, those having skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

I claim:

1. A method for testing at least one software application, the method comprising:

injecting a dynamic link library (DLL) into an executable code of the software application being tested;

installing at least one at least one hook function into an application programming interface (API) of an operating system, the installing performed by the DLL, the at least one hook function configured to monitor for testing operating system messages communicated with the software application during execution of the software application being tested;

retrieving information descriptive of a state of operation of the software application being tested and at least one graphics element rendered during execution of the software application being tested, wherein the information identifies an executable feature associated with the at least one graphics element, and wherein at least some of the retrieved information descriptive of the state of operation is based on messages monitored by way of the at least one hook function;

storing information related to an association between the executable feature and the at least one graphics element and the state of operation of the software application in a map data structure containing information related to at least one graphics element for testing, the association and information being stored in the map data structure during execution of the software application being tested;

automatically selecting an executable feature from the map data structure based on the association stored in the map data structure;

automatically, executing the selected executable feature associated with the graphics element; and dynamically updating the information related to the state of operation of the software application and the association in the map data structure upon execution of the executable feature.

2. The method of claim 1, further comprising:

dynamically updating information in the map data structure descriptive of at least one second graphics element resulting from the exposure of a new state of operation of the software application in response to the execution of the executable feature;

displaying the at least one second graphics element;

retrieving information descriptive of the state of operation of the software application being tested and the at least one second graphics element rendered during execution of the software being tested, the information including a second executable feature associated with the at least one second graphics element and the new state of operation of the software application;

storing the information descriptive of the new state of operation of the software application being tested and the second executable feature in association with the at least one second graphics element in the map data structure during execution of the software being tested; and automatically executing the at least one second executable feature stored in association with the second graphics element.

3. The method of claim 1 wherein the retrieving comprises capturing information pertaining to the graphics element and the state of operation of the software application being tested.

4. The method of claim 1, wherein the storing includes updating an indicator associated with the at least one graphics element when the executable feature stored in association with the at least one graphics element is executed.

5. The method of claim 1 wherein the storing includes organizing the retrieved information such that the executable feature stored in association with the at least one graphics element can be interpreted by a computer-executable application capable of accessing the retrieved information.

6. The method of claim 1 wherein the storing includes organizing the retrieved information such that the executable feature stored in association with the at least one graphics element and the state of operation of the software application being tested can be interpreted by a user capable of accessing the retrieved information from memory.

7. The method of claim 1 wherein the automatically selecting comprises automatically selecting an executable feature not previously executed.

8. The method of claim 7 wherein the automatically selecting comprises reviewing an indicator to automatically select an executable feature not previously executed.

9. The method of claim 1 wherein the automatically selecting comprises automatically selecting executable features in a depth-first mode of operation.

10. The method of claim 1 wherein the automatically selecting comprises automatically selecting executable features in a breadth-first mode of operation.

11. The method of claim 1, wherein a state of operation of the software application includes a distinctive set of graphic elements, content, and associated actions of the software application during execution.

12. A system for generating a map, comprising:

a capture agent for retrieving information descriptive of a state of operation of a software application being tested and a plurality of graphics elements rendered during execution of the software application, the information including an executable feature associated with each graphics element, the capture agent including a dynamic link library (DLL) configured to be injected into an executable code of the software application being tested, the DLL further configured to install at least one hook function into an application programming interface (API) of an operating system, wherein the at least one hook function is configured to monitor messages communicated between the operating system and the software application during execution of the software application being tested;

an application driver for storing information in a map data structure related to an association between each executable feature and corresponding graphics element and a state of operation of the software application during execution of the software application being tested, wherein the map data structure contains information related to at least one graphics element for testing;

an application driver for automatically selecting one of the executable features stored in the map data structure based on the information stored in the map data structure;

a command agent for automatically executing the selected executable feature; and an indicator for tracking a dynamic updating of the information related to the association and the state of operation of the software application in the map data structure upon the automatic execution of the selected executable feature.

13. The system of claim 12 wherein the capture agent is invoked by the application driver.

14. The system of claim 12 wherein the capture agent submits the retrieved information to the application driver.

15. The system of claim 12, wherein the application driver automatically selects one of the executable features that has not been previously executed.

16. The system of claim 12, wherein the application driver reviews the indicator to automatically select the one executable feature.

17. The system of claim 12, wherein the application driver automatically selects executable features according to a depth-first deterministic mode of operation.

18. The system of claim 12 wherein the application driver automatically selects executable features according to a breadth-first deterministic mode of operation.

19. A method for systematically invoking an executable feature of a software application having a graphical user interface, the method comprising:
   injecting a dynamic link library (DLL) into an executable code of the software application;
   installing at least one hook function into an application programming interface (API) of an operating system, the installing performed by the DLL, the at least one hook function configured to monitor operating system messages communicated with the software application during execution of the software application being tested;
   retrieving information descriptive of a state of operation of a software application being tested and at least one graphics element rendered during execution of the software application, the information including an executable feature associated with the at least one graphics element, at least some of the retrieved information descriptive of a state of operation of the software application retrieved by way of messages monitored by the at least one hook function;
   storing information related to an association between the executable feature and corresponding graphics element and the state of operation of the software application in a map data structure to contain information related to at least one graphics element for testing, the association and information being stored in the map data structure during execution of the software application;
   automatically selecting from the map data structure at least one executable feature associated with a graphics element that has not been previously executed; and
   automatically executing the selected at least one executable feature.

20. The method of claim 19 further comprising, in response to executing the selected executable feature:
   dynamically updating the information related to the association and the state of operation of the software application in the map data structure upon execution of the selected at least one executable feature;
   displaying a second graphics element;
   retrieving information descriptive of the second graphics element rendered during execution of the software application and the state of operation of the software application being tested, the information including an association of a second executable feature with the second graphics element and a new state of operation of the software application;
   storing the information descriptive of the new state of operation of the software application and the association between the second executable feature and the second graphics element in the map data structure;
   automatically selecting from the map data structure an executable feature that has not been previously executed, according to a sequence determined by one of a plurality of deterministic modes of execution of the software application; and
   automatically executing the selected executable feature.

21. The method of claim 19, wherein the retrieving comprises capturing information pertaining to the second graphics element.

22. The method of claim 19, wherein the storing comprises updating an indicator associated with the second graphics element when an executable feature stored in association with the graphics element is executed.

23. The method of claim 19, wherein the automatically selecting comprises reviewing an indicator to determine an executable feature not previously executed.

24. The method of claim 19, wherein the automatically selecting includes a depth-first mode of operation.

25. The method of claim 19, wherein the automatically selecting includes a breadth-first mode of operation.

* * * * *